United States Patent [19]
Motohashi

[11] Patent Number: 5,459,415
[45] Date of Patent: Oct. 17, 1995

[54] SIGNAL REPRODUCING APPARATUS AND UNIT FOR DETECTING LEADING EDGE OF SIGNAL

[75] Inventor: Shigeo Motohashi, Oume, Japan

[73] Assignee: Teac Corporation, Tokyo, Japan

[21] Appl. No.: 113,277

[22] Filed: Aug. 27, 1993

[30] Foreign Application Priority Data

Aug. 28, 1992 [JP] Japan .................................... 4-229739
Aug. 20, 1993 [JP] Japan .................................... 5-206109

[51] Int. Cl.$^6$ ................................................ H03K 5/24
[52] U.S. Cl. ................................ 327/24; 327/73; 327/74
[58] Field of Search ....................... 360/55, 10.1; 377/20,
377/17, 39; 307/354, 358, 494, 517; 328/115,
116, 117, 150, 109; 340/146.2; 327/24,
73, 74

[56] References Cited

U.S. PATENT DOCUMENTS

| | | | |
|---|---|---|---|
| 3,621,391 | 11/1971 | Miller | 377/39 |
| 4,224,644 | 9/1980 | Lewis et al. | 360/72.2 |
| 4,367,457 | 1/1983 | Tadauchi et al. | 307/358 |
| 4,414,676 | 11/1983 | Kraul et al. | 340/146.2 |
| 4,644,410 | 2/1987 | Schlichtig | 307/358 |
| 4,815,113 | 3/1989 | Ludwig et al. | 377/39 |
| 4,894,732 | 1/1990 | Ueda | 360/10.1 |
| 4,962,435 | 10/1990 | Furuta | 360/72.2 |
| 4,992,892 | 2/1991 | Yamada et al. | 360/27 |
| 5,107,135 | 4/1992 | Hagita | 307/358 |
| 5,274,273 | 12/1993 | Baginski et al. | 307/358 |

FOREIGN PATENT DOCUMENTS

| | | |
|---|---|---|
| 61-258357 | 11/1986 | Japan . |
| 63-076169 | 4/1988 | Japan . |
| 63-77278 | 4/1988 | Japan . |
| 1-149262 | 6/1989 | Japan . |

*Primary Examiner*—John S. Heyman
*Assistant Examiner*—My-Trang Nu Ton
*Attorney, Agent, or Firm*—Michael N. Meller

[57] ABSTRACT

A signal reproducing apparatus reproduces a signal recorded in a DAT by using a start ID. The signal reproducing apparatus includes an output circuit for reading out a signal from the DAT and for outputting a reproduction signal, a memory for storing signals, a controller for storing the reproduction signal from a predetermined region on the DAT by the output circuit, the predetermined region including a position identified by the start ID, a leading edge detector for detecting a position, in the memory, of a leading edge of the reproduction signal to be stored in the memory, a memory controller for reading out the reproduction signal starting from the position, in the memory, detected by the leading edge detector. A unit for detecting a leading edge of a signal includes a comparing circuit for comparing a level of a signal supplied from an external unit with a reference level, a detecting circuit for detecting a position of the leading edge of the signal based on comparison results obtained by the comparing circuit, and a controller for changing the reference level used by the comparing circuit in accordance with the signal supplied from the external unit.

6 Claims, 14 Drawing Sheets

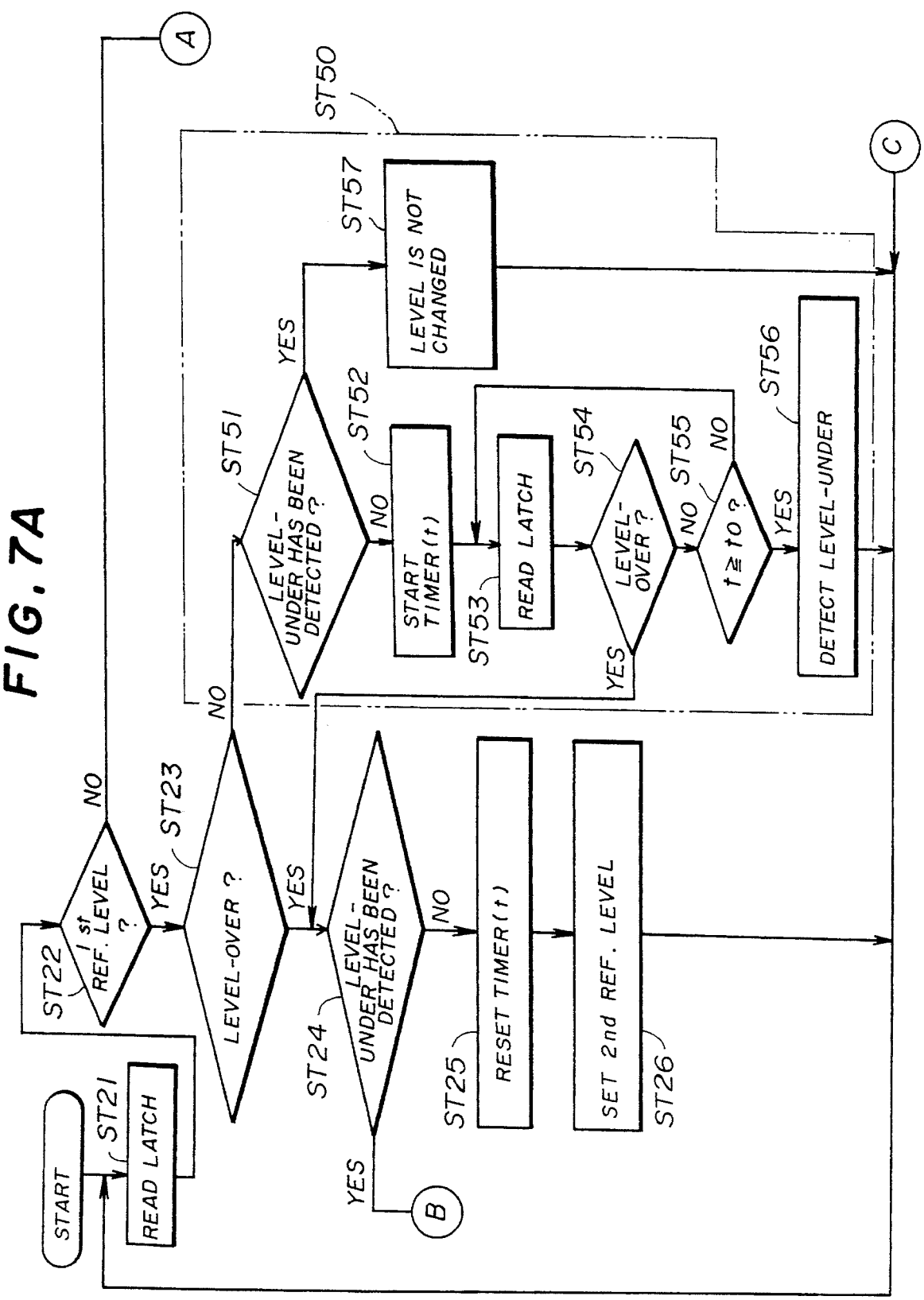

SIGNAL REPRODUCING APPARATUS AND UNIT FOR DETECTING LEADING EDGE OF SIGNAL

BACKGROUND OF THE INVENTION (1) Field of the invention

The present invention generally relates to a signal reproducing apparatus for reproducing a signal, such as an audio signal, from a recording medium, such as a DAT (Digital Audio Tape), and more particularly to a signal reproducing apparatus in which a signal can be rapidly and precisely reproduced starting from a leading edge of the signal. In addition the present invention relates to a unit capable of precisely detecting leading edges of various signals.

(2) Description of related art

Conventionally, for example, when an audio signal is recorded in a DAT, an identification signal, a so called start ID, is also recorded at a starting position of the audio signal. The audio signal is then reproduced starting from a position at which the start ID is detected. However, in many cases, a position at which the start ID is recorded in the DAT differs from an actual leading edge of the audio signal, at which leading edge the audio signal is activated. Thus, in a signal reproducing apparatus for the DAT, a recording position of the start ID can be changed by manual operations while listening to a music output by the reproduction of the audio signal.

In a CD (Compact Disk) on which tracks Tr are formed as shown in FIG. 1, a start ID is recorded in a starting position of an audio signal, but a position at which the start ID is recorded is not coincident with the actual leading edge of the audio signal. In a conventional CD player by which audio signals are reproduced from the CD 1, the signal reproduction in a track $Tr_o$ in which the start ID is recorded is repeatedly performed. While the signal reproduction is being repeated, a position at which the level of a reproduction signal is greatly changed in the CD 1 is detected, and the position is stored in a memory. When a start operation of the reproduction is performed, the audio signal is reproduced, independently the start ID, from the position stored in the memory.

The above process performed in the CD player may be applied to the signal reproducing apparatus for the DAT so that the start position at which the signal is to be reproduced from the DAT is rectified.

However, because the DAT is a tape shaped recording medium, a long time is required to repeat the signal reproduction in a predetermined region on the DAT, which region includes a position at which the start ID is recorded. In addition, as the leading edge of the signal is identified by a position on the DAT (the recording medium), it is difficult to rapidly reproduce the audio signal from the detected position identified as the position on the DAT when the start operation is performed.

In the signal reproducing apparatus for the DAT, the following technique has been proposed. That is, an audio signal recorded in a predetermined region on the DAT, which region includes the start ID, is stored in a memory, and the audio signal is then read out from a position, in the memory, corresponding to the start ID when the starting operation is performed. If the above technique is used, the audio signal can be rapidly reproduced starting from the leading edge thereof.

However, to detect the leading edge of the audio signal in the recording medium (the DAT), the signal reproduction must be repeated, as described above, and further, the signal recorded in a predetermined region must be reproduced again and then stored in the memory. Thus, a long time is required for making a state in which the reproduction signal can be output.

In addition, the audio signals to be stored in the recording medium such as the DAT include various background signals (noises). Levels of background signals under a silent condition in which there is no audio signal corresponding to a music differ from each other based on recording conditions. Thus, in a case where the leading edge of the signal is detected using a single reference level, it is difficult to precisely detect the leading edges of various signals which has been recorded under conditions in which different background signals (noises) are included in the signals.

SUMMARY OF THE INVENTION

Accordingly, a general object of the present invention is to provide a novel and useful signal reproducing apparatus and a unit for detecting a leading edge of a signal.

A more specific object of the present invention is to provide a signal reproducing apparatus in which the signal reproduction can be rapidly performed starting from the leading edge of the signal even if a tape shaped recording medium such as the DAT is used.

The above objects of the present invention are achieved by a signal reproducing apparatus for reproducing a signal recorded in a recording medium by using start position information indicating a start position of the signal on said recording medium, said signal reproducing apparatus comprising: output means for reading out a signal from said recording medium and for outputting a reproduction signal; memory means for storing signals; control means, coupled to said output means and said memory means, for storing the reproduction signal from a predetermined region in said recording medium by the output means, the predetermined region including a position identified by said start position information; leading edge detecting means for detecting a position, in said memory means, of a leading edge of the reproduction signal to be stored in said memory by said control means; memory control means, coupled to said leading edge detecting means and said memory means, for reading out the reproduction signal starting from the position, in said memory means, detected by said leading edge detecting means.

According to the above signal reproduction apparatus, the position in the memory means corresponding to the leading edge of the reproduction signal to be stored in the memory means is detected by the leading edge detecting means, and reading of the reproduction signal starts from the detected position in the memory. Thus, the signal reproduction can be rapidly performed starting from the leading edge of the signal even if a tape shaped recording medium such as the DAT is used.

Another object of the present invention is to provide a unit for precisely detecting leading edges of various signals.

The above objects of the present invention are achieved by a unit for detecting a leading edge of a signal, said unit comprising: comparing means for comparing a level of a signal supplied from an external unit with a reference level; detecting means for detecting a position of the leading edge of the signal based on comparison results obtained by said comparing means; and reference level changing means for changing the reference level used by said comparing means in accordance with the signal supplied from said external unit.

According to the unit for detecting the leading edge of the signal, the leading edge of the signal is detected using a reference level depending on the level of the signal. Thus, the leading edges of various signals can be precisely detected.

Additional objects, features and advantages will become apparent from the following detailed description when read in conjunction with the accompanying drawings.

BRIEF DESCRIPTION OF THE DRAWINGS

FIG. 7A, 7B and 7C are flow charts illustrating a process for detecting the leading edge of an audio signal reproduced from the DAT.

DESCRIPTION OF THE PREFERRED EMBODIMENTS

A description will now be given of an embodiment of the present invention.

Figure 1:
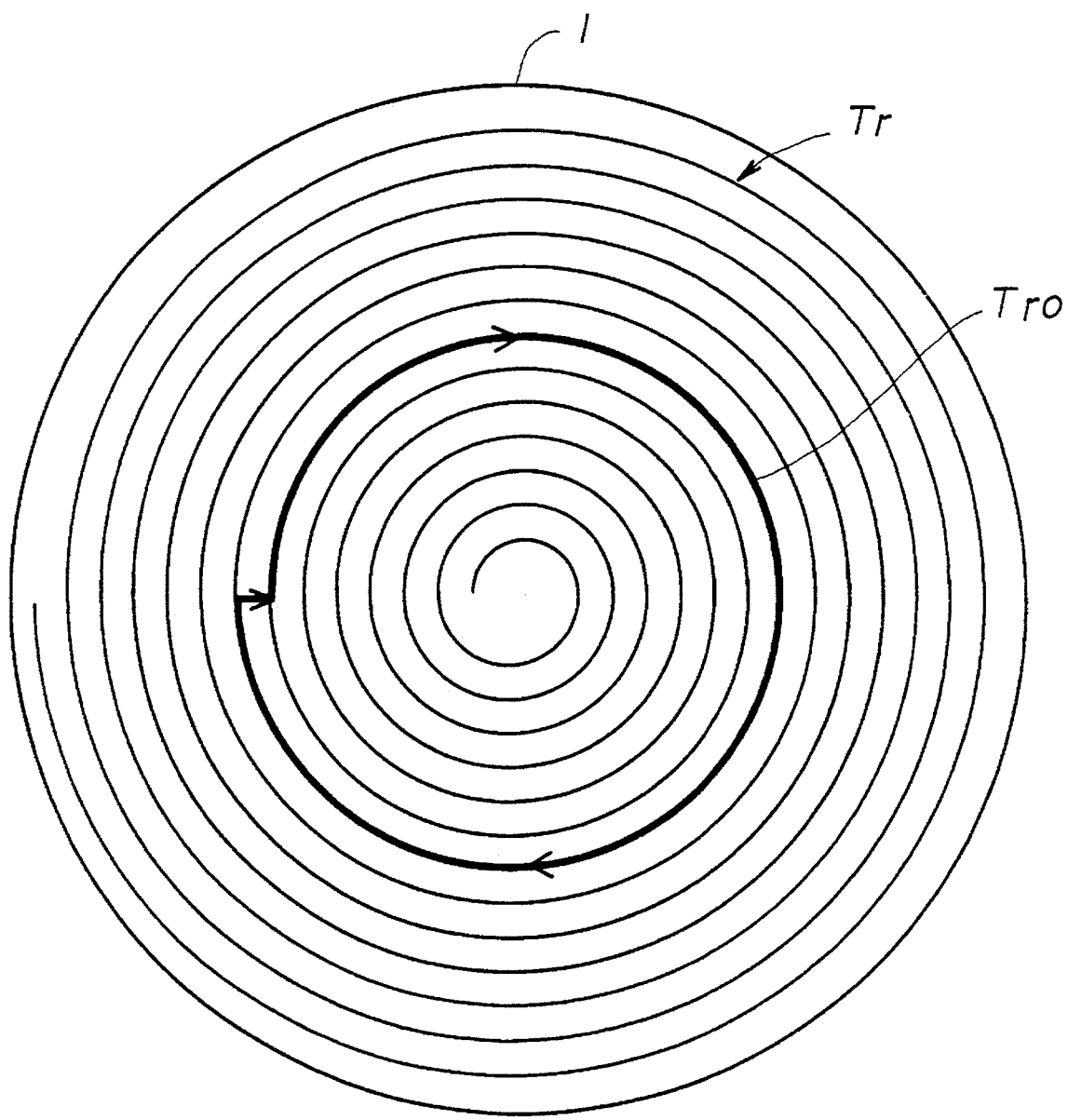
FIG. 1 is a diagram illustrating a recording track on a CD (Compact Disk).
Figure 2:
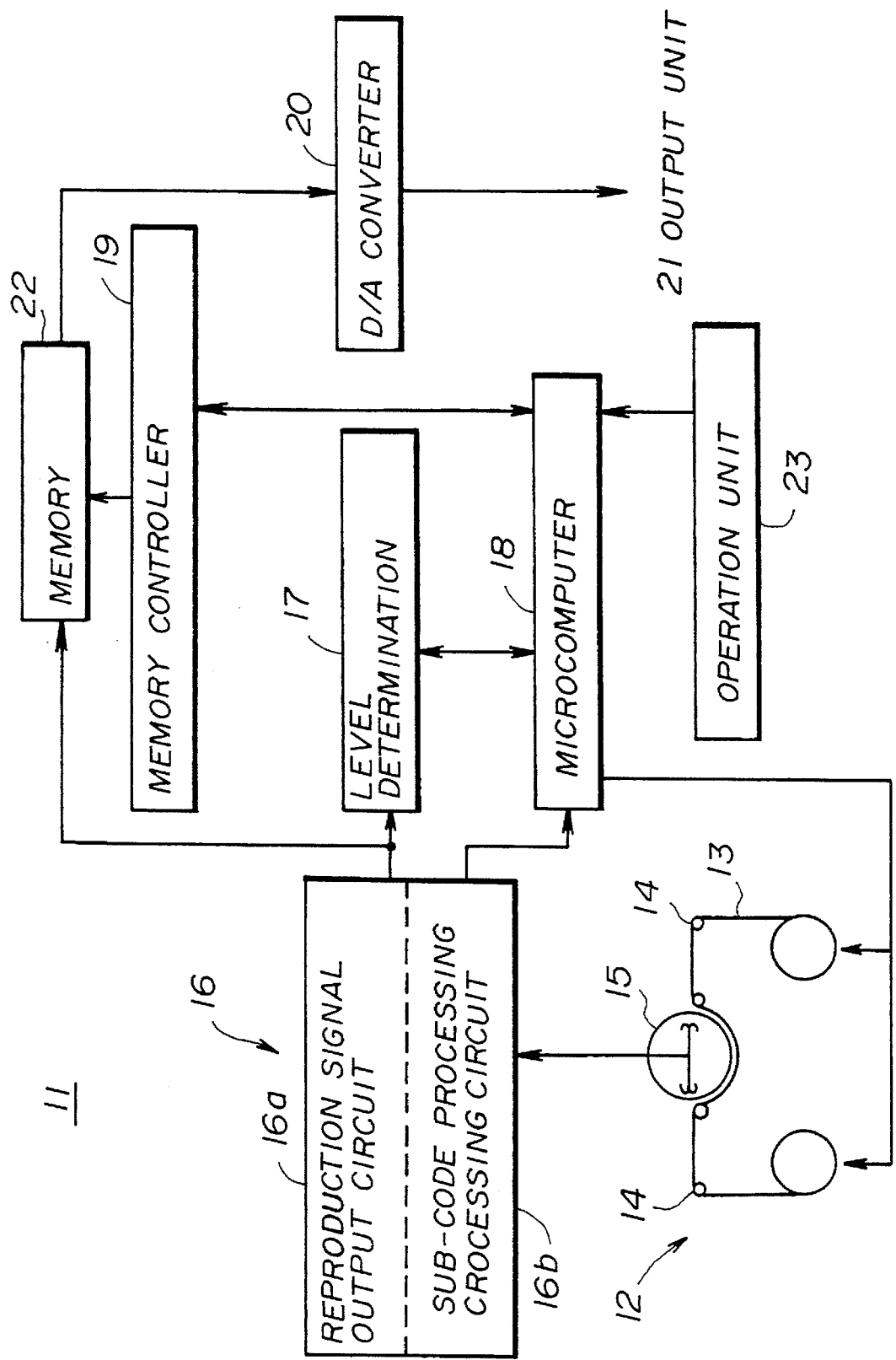
FIG. 2 is a block diagram illustrating an example of a structure of a magnetic recording/reproducing apparatus (a DAT).

FIG. 2 shows a signal reproducing apparatus according to an embodiment of the present invention. The signal reproduction apparatus shown in FIG. 2 is a magnetic recording/reproducing apparatus 11 referred to as a DAT (Digital Audio Tape recorder). The magnetic recording/reproducing apparatus 11 has a tape driving mechanism 12 for moving a magnetic tape 13 (a DAT) in a constant direction. In the tape driving mechanism 12, the magnetic tape 13 is guided by guide shafts 14 so that the magnetic tape 13 moves on the surface of a rotary head 15. The rotary head 15 is connected to a signal processing circuit 16 in which an RF modulation process, an error correction process and the like are performed. The signal processing circuit 16 has a reproduction signal output circuit 16a for outputting a reproduction signal based on a read signal from the rotary head 15 and a sub-code processing circuit 16b for processing sub-codes such as a start ID and tape time information. The reproduction signal output circuit 16a outputs digital reproduction signals, and the digital reproduction signals are supplied to a level determination circuit 17 and a memory 22 formed of a ring buffer. The sub-code processing circuit 16b is connected to a microcomputer 18.

A memory controller 19 performs writing and reading controls of the memory 22 in accordance with instructions supplied from the microcomputer 18. Reproduction signals read out from the memory 22 are supplied to an output unit 21 via a digital-to-analog (D/A) converter 20. The microcomputer 18 is connected to an operation unit 23 having a keyboard. The microcomputer 18 inputs sub-codes from the sub-code processing circuit 16b, determination results obtained by the level determination circuit 17 and operating information from the operation unit 23. The microcomputer 18 controls the tape driving mechanism 12, the memory controller 19 and other parts of this apparatus in accordance with the above items of the information supplied thereto.

Figure 3:
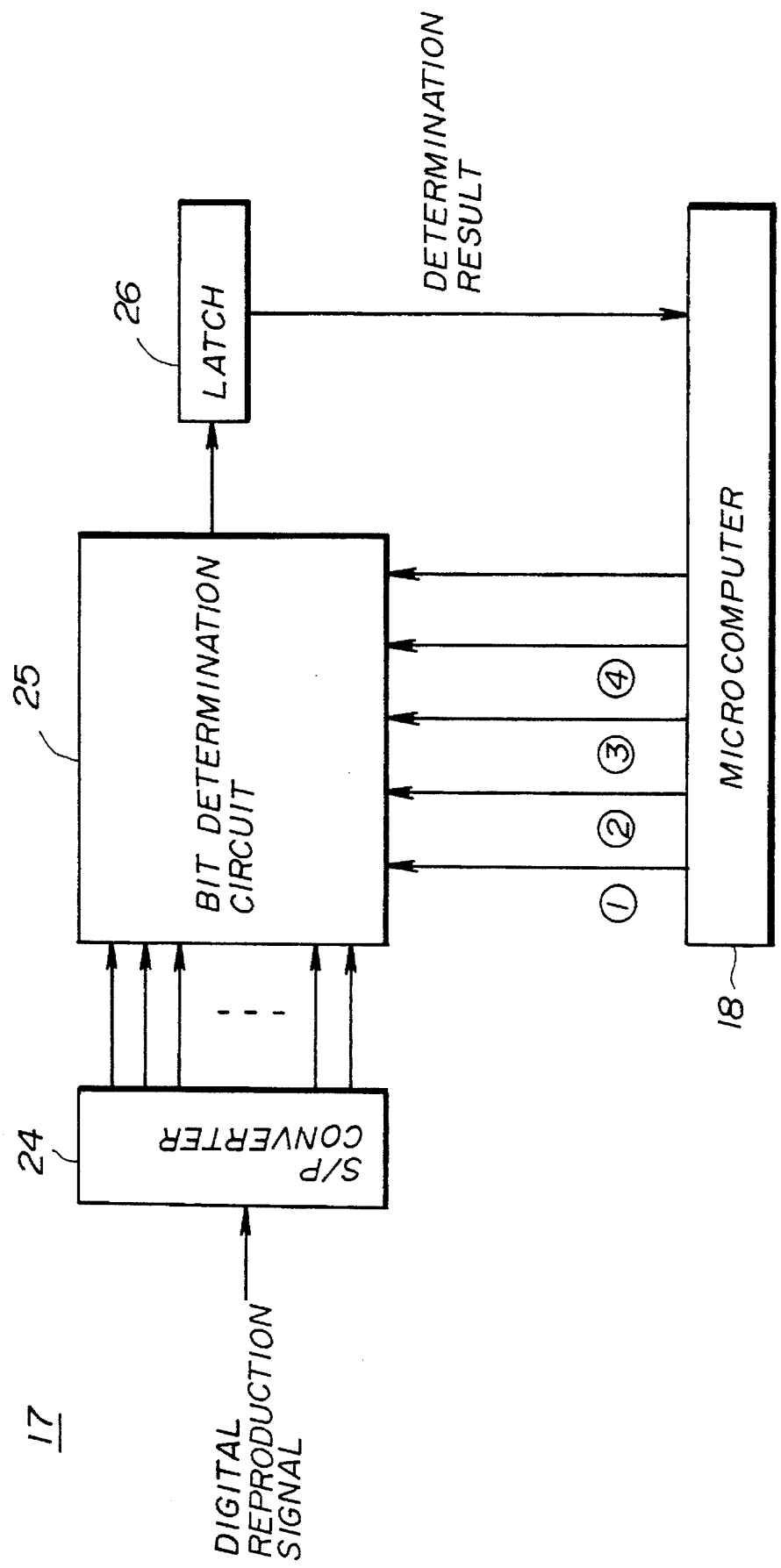
FIG. 3 is a block diagram illustrating a level determination circuit provided in the magnetic recording/reproducing apparatus shown in FIG. 2.

The level determination circuit is formed, for example, as shown in FIG. 3.

Referring to FIG. 3, the level determination circuit 17 has a serial-to-parallel converter 24, a bit determination circuit 25 and a latch circuit 26. The serial-to-parallel converter 24 converts digital reproduction signals supplied from the reproduction signal output circuit 16a into parallel data, and supplies the parallel data to the bit determination circuit 25. The bit determination circuit 25 compares the level of the reproduction signal supplied via the serial-to-parallel converter 24 with a reference level corresponding to a level setting signal supplied to the microcomputer 18, and determines whether or not the level of the reproduction signal is higher than the reference level. The microcomputer 18 selects a level setting signal from among level setting signals corresponding to, for example, four reference levels, and supplies it to the bit determination circuit 25. The latch circuit 26 latches a determination result obtained by the bit determination circuit 25. If the level of the reproduction signal is equal to or greater than the selected reference level, the determination result obtained by the bit determination circuit 25 is represented by a bit "1". On the other hand, if the level of the reproduction signal is less than the selected reference level, the determination result obtained by the bit determination circuit 25 is represented by a bit "0". The microcomputer 18 periodically checks the determination result latched in the latch circuit 26, and switches the level setting signal based on the determination result. The microcomputer 18 detects the leading edge of a reproduction signal based on changes in the determination result latched in the latch circuit 26.

Figure 4:
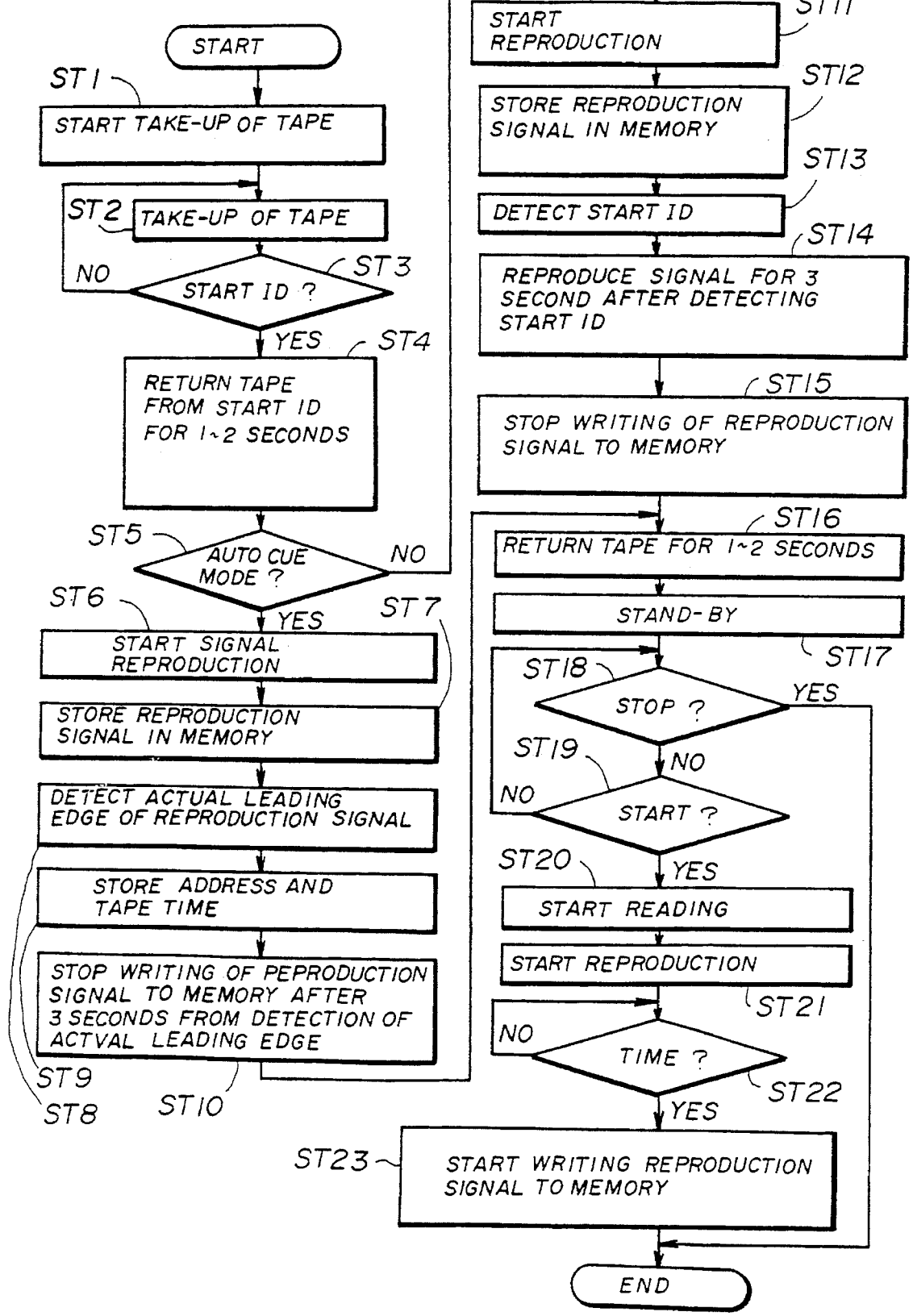
FIG. 4 is a flow chart illustrating a process for reproducing an audio signal from a DAT.

When a user operates a skip button in the operation unit 23 to reproduce music recorded in the magnetic tape from a starting point thereof, a process as shown in FIG. 4 is performed.

The microcomputer 18 outputs a take-up starting signal to the tape driving mechanism 12 based on the operation of the skip button (ST1). The tape driving mechanism 12 takes up the magnetic tape 13 in either a quick forwarding mode or a quick rewinding mode (ST2). While taking up the magnetic tape 13, the microcomputer 18 determines whether or not a start ID has been read out from the magnetic tape 13 (ST3). When the start ID is read out, the start ID detecting signal is output from the sub-code processing circuit 16b. When it is determined, based on the start ID detecting signal, that the start ID has been read out, the microcomputer 18 controls the tape driving mechanism 12 so that the magnetic tape 13 is returned from the start ID to a position for one or two seconds (the tape time information) (ST4).

Figure 5:
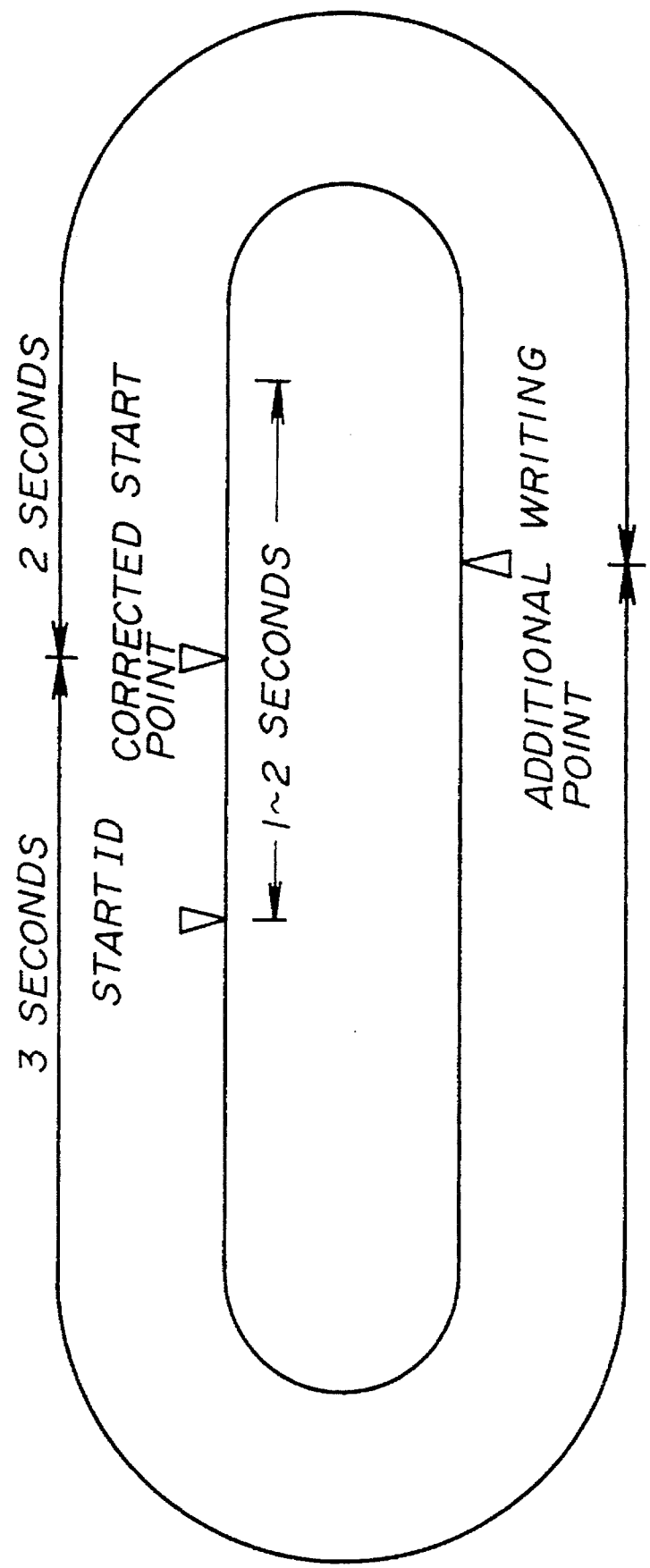
FIG. 5 is a diagram illustrating an operation performed in a ring buffer in accordance with the process shown in FIG. 4.
Figure 6:
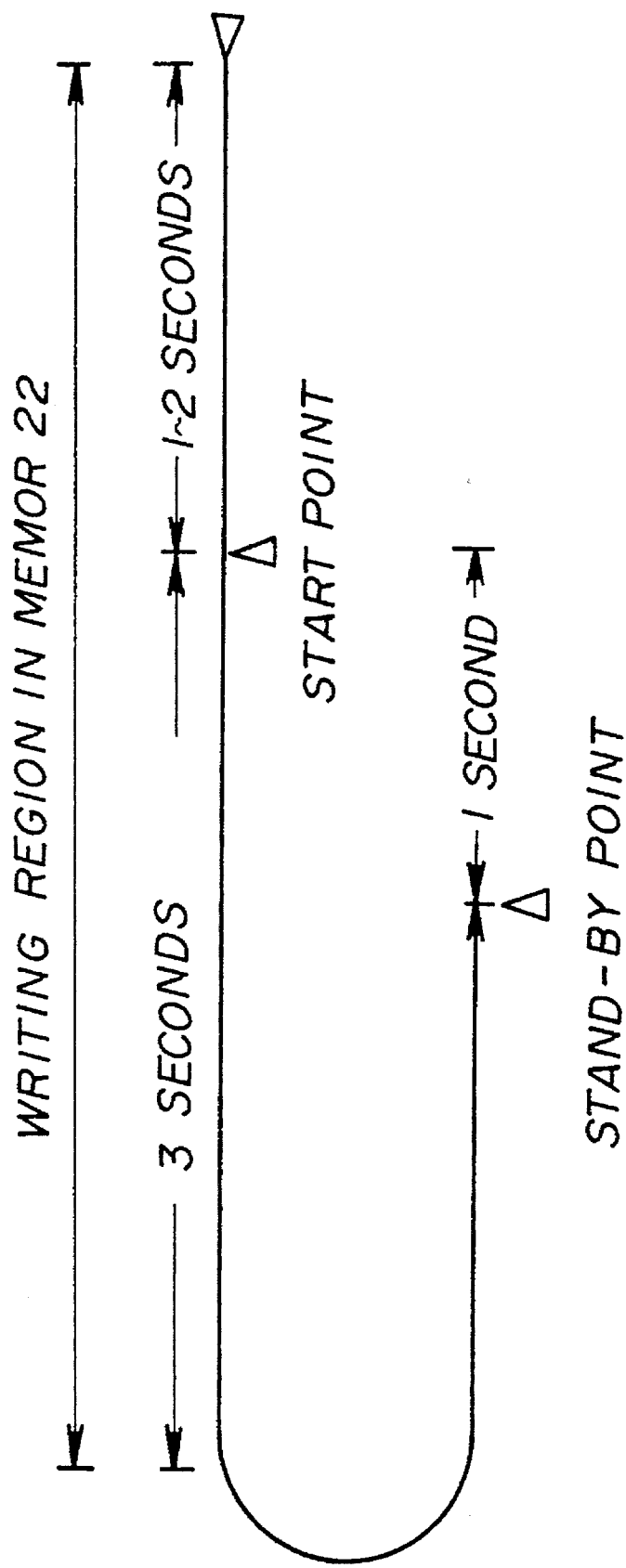
FIG. 6 is a diagram illustrating an operation performed in accordance with the process shown in FIG. 4.

After this, the microcomputer 18 determines whether or not an auto cue mode is set (ST5). The auto cue mode can be set by operating an auto cue switch in the operation unit 23. If the auto cue mode is set, the reproduction of the signal to be reproduced from the magnetic tape 13 starts (ST6). At this time, a data write starting signal is supplied from the microcomputer 18 to the memory controller 19 (ST7), and the memory controller 19 writes the reproduction signal output from the reproduction signal output circuit 16a in the memory 22. That is, the reproduction signal successively read out starting from a position, in the magnetic tape 13, to which the magnetic tape 13 is returned for one or two seconds (the tape time information) from the start ID is stored in the memory 22 (the ring buffer), as shown in FIGS. 5 and 6. The reproduction signal output from the reproduction signal output circuit 16a is then supplied to the level determination circuit 17. The level determination circuit 17 determines whether or not the level of the reproduction signal is greater than the reference level set in accordance with a level setting signal selected by the microcomputer 18. The microcomputer 18 detects the leading edge of the reproduction signal based on the determination results obtained by the level determination circuit 17 (ST8). A process for detecting the leading edge of the reproduction signal will be described later. When the leading edge of the reproduction signal is detected, an address and a tape time corresponding to the leading edge of the reproduction signal are stored in an internal memory (not shown in FIG. 2) (ST9). After this, the writing of the reproduction signal in the memory 22 is stopped three seconds (the tape time information) after a time at which the leading edge of the reproduction signal has been detected (ST10).

When the writing of the reproduction signal in the memory 22 is stopped, the microcomputer 18 controls the tape driving mechanism 12 so that the magnetic tape 13 is returned to a position for two seconds (the tape time information) (ST16). The microcomputer 18 waits in a stand-by state for an instruction input from the operation unit 23 (ST17). At this time, a position at which the signal is to be reproduced from the magnetic tape 13 is maintained at a stand-by point as shown in FIG. 5. In the above process, the memory controller 19 always supplies to the microcomputer 18 addresses in which the reproduction signals are to be stored in the memory 22 and tape time information representing positions at which the signals are recorded on the magnetic tape 13.

When a stop button in the operation unit 23 is operated under a condition in which the microcomputer 18 is in the above stand-by state, all operating states are reset and the process is completed. On the other hand, when a start button is operated (ST19), the stand-by state is removed in the microcomputer 18. The reading out of the reproduction signal starts from the address in the memory 22, which address is stored in the internal memory of the microcomputer 18 so as to correspond to the leading edge of the reproduction signal (ST20). The operation of the tape driving mechanism 12 starts in accordance with an instruction from the microcomputer 18, and the reproduction of the signal starts from the stand-by point (ST21). The reproduction signal read out from the memory 22 is converted by the digital-to-analog converter 20 into an analog signal and the analog signal is supplied to the output unit 21. After the signal reproduction has started from the stand-by point, the microcomputer 18 determines whether or not tape time information included in the sub-code information read out from the magnetic tape 13 along with the reproduction signal is coincident to the tape time information (stored in the internal memory) obtained when the writing of the reproduction signal in the memory 22 was stopped in step ST10 (ST22). When the tape time information read out from the magnetic tape 13 is coincident with the time information stored in the internal memory of the microcomputer 18, the memory controller 19 restarts a process for storing reproduction signals output from the reproduction signal output circuit 16a. After this, the memory controller 19 writes the reproduction signals from the reproduction signal output circuit 16a in the memory 22, and reads out the reproduction signals stored in the memory 22. A position at which the writing of the reproduction signal in the memory 22 starts is shown as an additional writing point in FIG. 5.

On the other hand, when the microcomputer 18 determines, in step ST5, that the auto cue mode has not been set, the process proceeds to step ST11. In step ST11, the reproduction of the signal in the magnetic tape 13 is started. At this time, the data write starting signal is supplied from the microcomputer 18 to the memory controller 19 (ST12), and the reproduction signal output from the reproduction signal output circuit 16a is written in the memory 22. That is, in this case, the reproduction signal successively read out from a position, in the magnetic tape 13, to which the magnetic tape 13 is returned for one or two seconds (the tape time information) from the start ID is written in the memory 22 (the ring buffer), as shown in FIG. 5, in the same manner as in the auto cue mode. If the microcomputer 18 detects the start ID while the reproduction signal is being written in the memory 22 (ST13), the reproduction signal is continuously written in the memory 22 for three seconds after the start ID has been detected (ST14). When three seconds have elapsed from a time at which the start ID has been detected, the writing of the reproduction signal in the memory 22 is stopped.

After this, steps ST18 through ST23 are executed in the same manner as in the auto cue mode. In this process, the reading out of the reproduction signal starts from an address, in the memory 22, corresponding to the start ID (the start point).

According to the above process as shown in FIG. 4, in the auto cue mode, the leading edge of the reproduction signal is detected and a position (an address) in the memory 22 corresponding to the detected leading edge of the reproduction signal is stored in the internal memory of the microcomputer 18. Then, when the start button is operated, reading out of the reproduction signal is started from the address corresponding to the lead edge thereof. On the other hand, in a case where the auto cue mode is not set, reading out of the reproduction signal is started from an address in the memory 22 corresponding to the start ID. Thus, in the auto cue mode, even if the position corresponding to the start ID differs from the position corresponding to the actual leading edge of the reproduction signal, outputting of the reproduction signal can be started from the leading edge thereof.

Figure 7B:
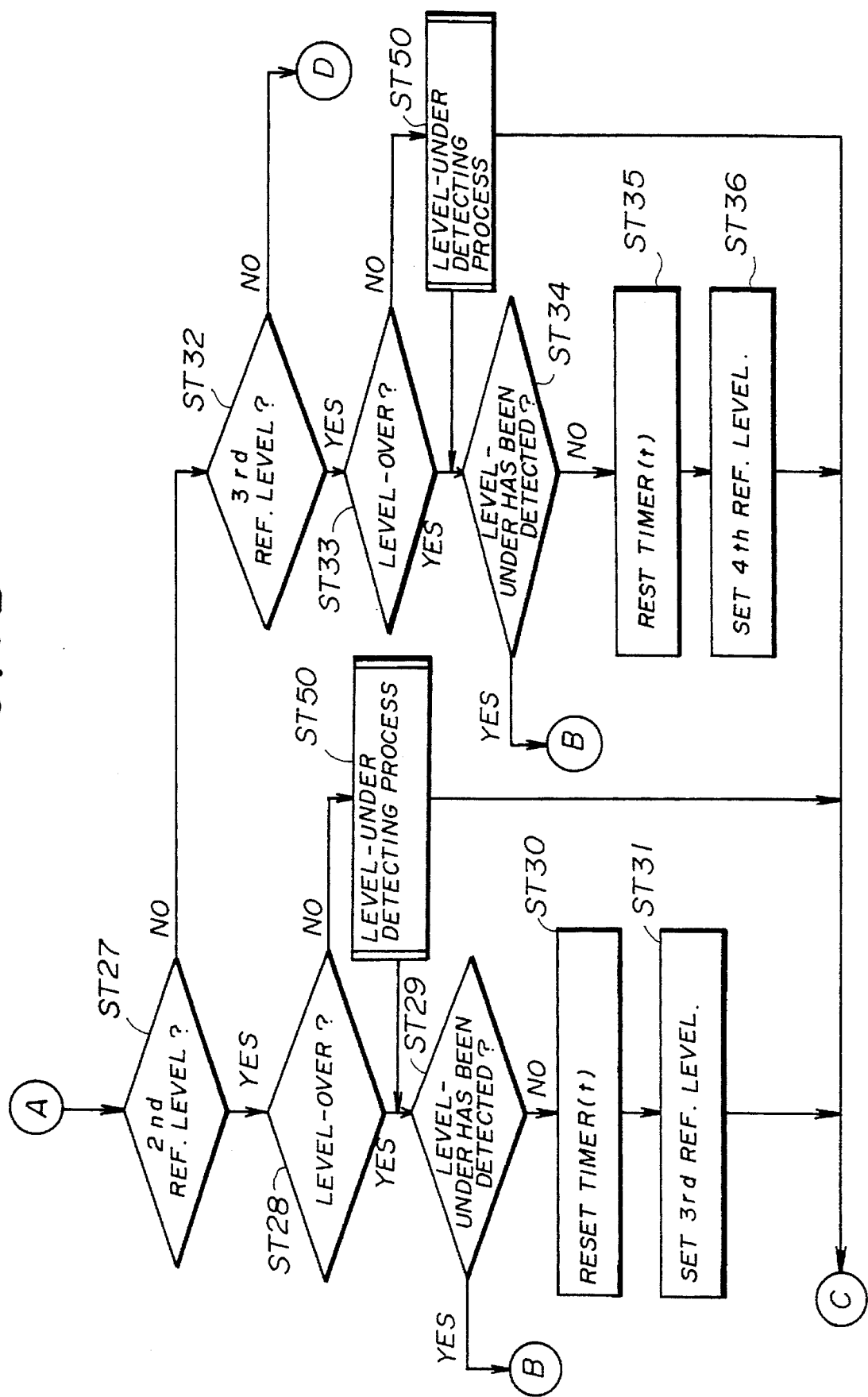
Figure 7C:
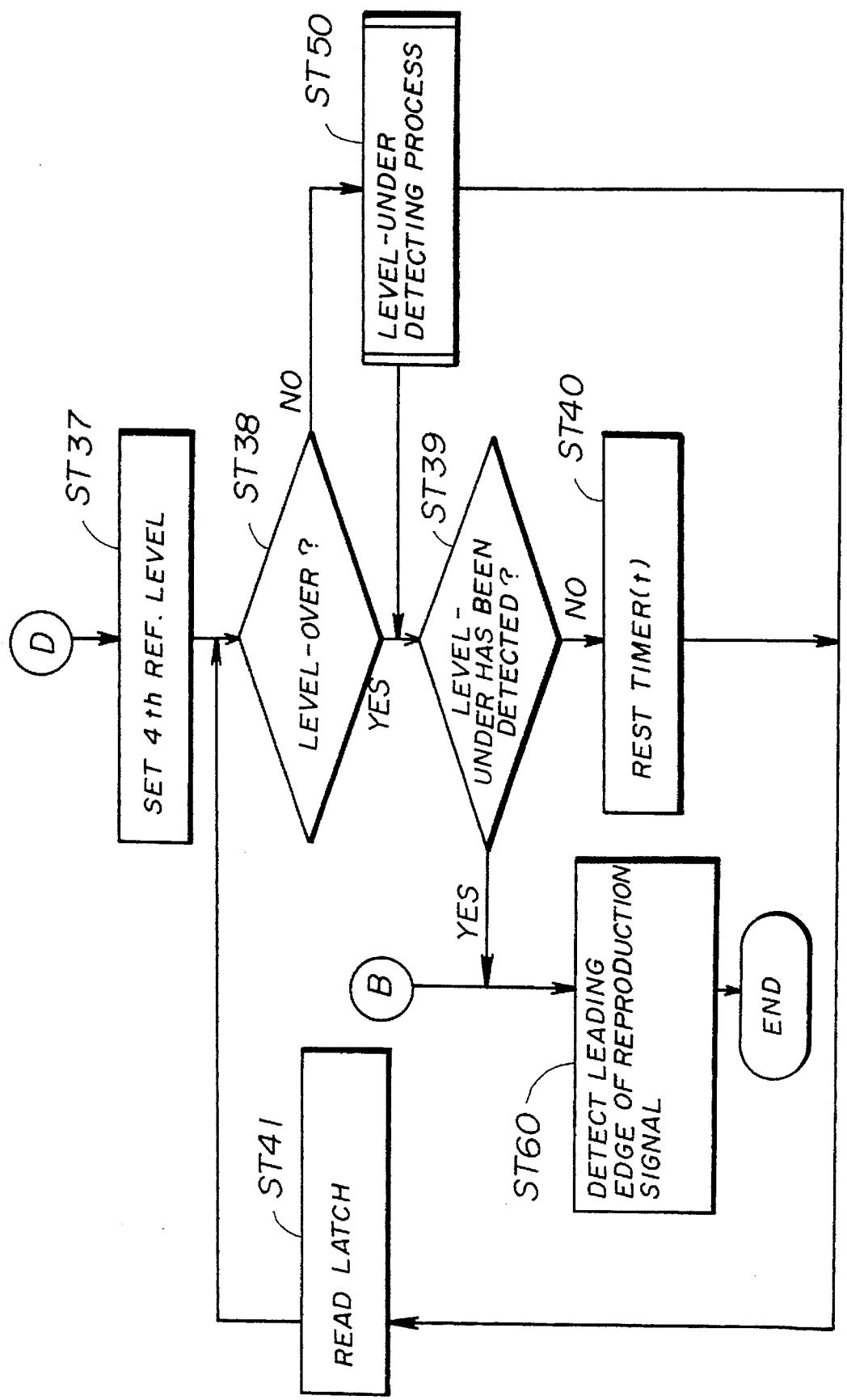

The process, in step ST8, for detecting the leading edge of the reproduction signal is executed in accordance with the flow charts shown in FIG. 7A, 7B and 7C.

The microcomputer 18 outputs one of four types of level setting signals; a first level setting signal corresponding to a first reference level (e.g. −70 dB), a second level setting signal corresponding to a second reference level (e.g. −65 dB), a third level setting signal corresponding to a third reference level (e.g. −60 dB) and a fourth level setting signal corresponding to a fourth reference level (e.g. −55 dB). That is, the first reference level is the lowest level, the fourth reference level is the highest level, and the second reference level is lower than the third reference level.

Immediately after the signal reproduction starts, the microcomputer 18 supplies the first level setting signal to the level determination circuit 17 so that the level determination circuit 17 determines whether or not the level of the reproduction signal is higher than the first reference level (e.g. −70 dB), which is the lowest reference level. Referring to FIG. 7A, the microcomputer 18 reads out the determination result latched in the latch circuit 26 (ST21), and determines whether or not a level setting signal supplied to the level determination circuit 17 is the first level setting signal (ST22). As the first level setting signal is output from the microcomputer 18, the microcomputer 18 determines, based on the determination result obtained in step ST21, whether or not the reproduction signal is in a level-over condition in which the level of the reproduction signal is higher than a reference level (ST23). If it is determined that the reproduction signal is in the level-over condition, the microcomputer 18 further determines whether or not a level-under condition has already been detected (ST24), the level under condition being a condition in which the level of the reproduction signal is lower than a reference level. If the level-under condition has not been detected yet, a timer (t) used in a level-under detecting process ST50 which will be described later is reset (ST25). The microcomputer 18 then switches the first level setting signal to the second level setting signal (ST26). As a result, after this, the level determination circuit 17 determines whether or not the level of the reproduction signal is higher than the second reference level (e.g. −65 dB), which is higher than the first reference level.

After the microcomputer 18 reads out the determination result from the latch circuit 26 in step ST21, the process proceeds via step ST22 to step ST27 shown in FIG. 7B. Under a condition in which the microcomputer 18 outputs the second reference setting signal, it is then determined whether or not the reproduction signal is in the level-over condition (ST28). If the reproduction signal is in the level-over condition, it is further determined whether or not the level-under condition has already been detected (ST29). If the level-under condition has not been detected yet, the timer (t) is reset (ST30), and the microcomputer 18 switches the second level setting signal to the third level setting signal (ST31). As a result, after this, the level determination circuit 17 determines whether or not the level of the reproduction signal is higher than the third reference level (e.g. −60 dB), which is higher than the second reference level.

After the microcomputer 18 reads out the determination result from the latch circuit 26 in step ST21, the process proceeds via steps ST22 and ST27 to step ST32 shown in FIG. 7B. Under a condition in which the microcomputer 18 outputs the third reference setting signal, steps ST33 through ST35, which are the same as steps ST28 through ST30 in a case where the microcomputer 18 outputs the second level setting signal, are executed. In this case, if the reproduction signal is in the level-over condition and the level-under condition has not been detected yet, the microcomputer 18 switches the third level setting signal to the fourth level setting signal (ST36). As a result, after this, the level determination circuit 17 determines whether or not the level of the reproduction signal is higher than the fourth reference level (e.g. −55 dB), which is higher than the third reference level.

After the microcomputer 18 reads out the determination result from the latch circuit 26 in step ST21, the process proceeds via steps ST22, ST27 and ST32 to step ST37 shown in FIG. 7C. The microcomputer 18 outputs the fourth reference setting signal (ST37), and steps ST38 through ST40, which are the same as the steps ST33 through ST35 in a case whrere the microcomputer 18 outputs the third level setting signal, are executed. After this, step 41 in which the microcomputer 18 reads out the determination result from the latch circuit 26 and the above steps ST38 through ST40 are repeated.

As has been described above, the reference level set in the level determination circuit 17 increases in an order from the first to fourth reference levels. In this process, if the microcomputer 18 determines that the reproduction signal is not in the level-over condition, the level-under detecting process in ST50 is executed. If the level of the background signal (noises) reproduced from the magnetic tape 13 is very low, it is detected, under a condition in which the first reference level (the lowest reference level; e.g. −70 dB) is set in the level determination circuit 17, that the reproduction signal is not in the level-over condition (ST23). If the level of the background signal (noises) is high, it is detected, under a condition in which the fourth reference level (the highest reference level; e.g. −55 dB) is set in the level determination circuit 17, that the reproduction signal is not in the level-over condition (ST38). If the level of the background signal (noises) is medium, it is detected, under a condition in which either the second or third reference level is set in the level determination circuit 17, that the reproduction signal is not in the level-over condition (ST28 or ST33).

If it is detected under the condition, for example, in which the first reference level is set in the level determination circuit 17, that the reproduction signal is not in the level-over condition, the process proceeds from step ST23 to step ST51. That is, it is determined whether or not the level-under condition has already been detected (ST51). If the level-under condition has not been detected yet, the timer (t) starts (ST52). After this, step ST53 in which the determination result latched in the latch circuit 26 is read out, step ST54 in which it is determined, based on the determination result read out from the latch circuit 26, whether or not the reproduction signal is in the level-over condition, and step ST55 in which it is determined whether or not a value t of the timer (t) is equal to or greater than a predetermined reference time $t_o$ are repeated. The reference time $t_o$ is set, for example, at 1 seconds. If it is determined that the reproduction signal is in the level-over condition, the process returns to step ST24. Further, if the value t of the timer (t) exceeds the reference time $t_o$, the microcomputer 18 detects the level-under condition of the production signal (ST56). Information indicating that the level-under condition has been detected is then stored in the internal memory of the microcomputer 18.

As has described above, in the level-under detecting process in ST50, when the reproduction signal is maintained at a level lower than the reference level for a time equal to or greater than the reference time $t_o$, the level-under condition is detected.

After this, the process proceeds to step ST23 via steps ST21 and ST22. When it is determined that the reproduction signal is not in the level-over condition, it is further determined whether or not the level-under condition has already been detected (ST51). As the information indicating that the level-under condition has been detected is stored in the internal memory at this time, the microcomputer 18 recognizes that the level of the production signal has not been changed (ST57). Steps ST21, ST22, ST23, ST51 and ST57 are then repeated. When the reproduction signal rises (for example, music starts), it is determined, in step ST23, that the reproduction signal is in the level-over condition. When it is further determined, with reference to the information stored in the internal memory, that the level-under condition has already been detected, the process proceeds to step ST60 shown in FIG. 7C. That is, the microcomputer 18 detects the leading edge at which the reproduction signal raises (is activated).

Figure 8:
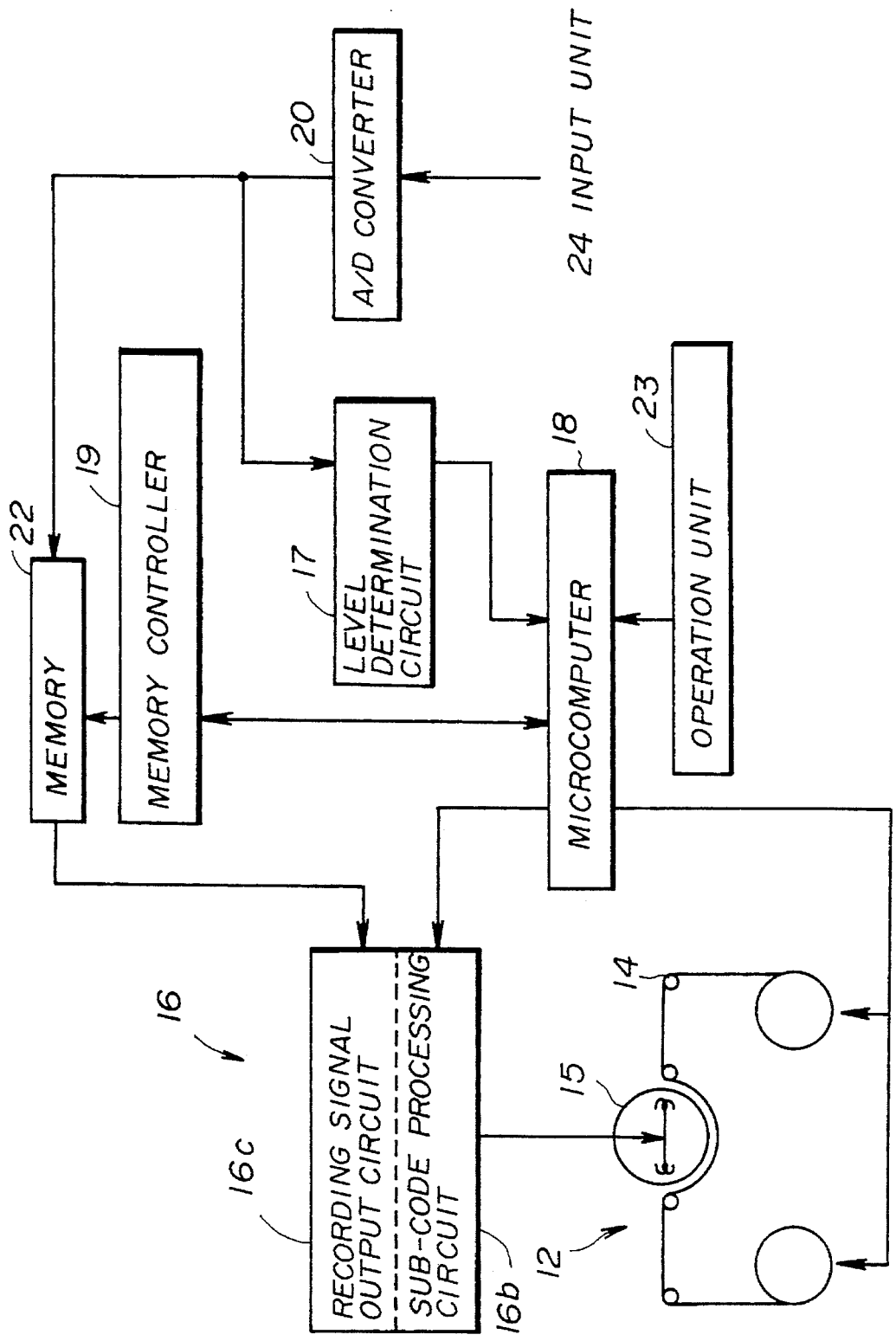
FIG. 8 is a block diagram illustrating a recording apparatus having a unit for detecting a leading edge of a signal.

The process for detecting the leading edge of the signal can be also applied to a recording circuit provided in the magnetic recording/reproducing apparatus 11. FIG. 8 shows the recording circuit. In FIG. 8, those parts which are the same as those shown in FIG. 2 are given the same reference numbers.

Referring to FIG. 8, an input unit 24 receives an audio signal supplied from an external unit, and the audio signal is supplied from the input unit 24 to the analog-to-digital converter 25. The audio signal output from the analog-to-digital converter 25 is supplied to the memory 22 and is written in the memory 22. The audio signal read out from the memory 22 is supplied to a recording signal output circuit 16c of the signal processing circuit 16. The recording signal output circuit 16c performs a process for adding error correcting codes to the audio signal, an interleave process, a modulating process and the like and generates a recording signal to be recorded on the magnetic tape 13 (the DAT). The sub-code processing circuit 16b of the signal processing circuit 16 adds the address information and various sub-codes to the recording signal. The recording signal output from the signal processing circuit 16 is recorded on the magnetic tape 13 via the rotary head 15.

The reading process and the writing process of the memory 22 are controlled by the memory controller 19 in accordance with instructions from the microcomputer 18. The microcomputer 18 also controls the signal processing circuit 16 and the tape driving mechanism 12.

The audio signal is supplied from the analog-to-digital converter 25 to the level determination circuit 17. The level determination circuit 17 is formed as shown in FIG. 3. The microcomputer 18 detects the leading edge of the audio signal based on the determination results obtained by the level determination circuit 17. When the microcomputer 18 detects the leading edge of the audio signal, an address corresponding to a position of the leading edge of the audio signal is stored in the internal memory of the microcomputer 18. When the recording signal corresponding to the audio signal input to this recording circuit is recorded on the magnetic tape 13, the address indicating a position of the leading edge of the audio signal is supplied from the microcomputer 18 to the sub-code processing circuit 16b. The sub-code processing circuit 16b supplies a start ID to the rotary head 15 so that the start ID is recorded at a position corresponding to the address indicating the position of the leading edge of the audio signal.

The microcomputer 18 performs the process for detecting the leading edge of the audio signal in accordance with flow charts as shown in FIGS. 9A, 9B, 9C and 9D.

The microcomputer 18 initially supplies the fourth level setting signal to the level determination circuit 17 so that the level determination circuit 17 determines whether or not the level of the audio signal is lower than the fourth reference level (e.g. −55 dB), which is the highest reference level. After this, the process shown in FIGS. 9A through 9D is started.

Figure 9A:
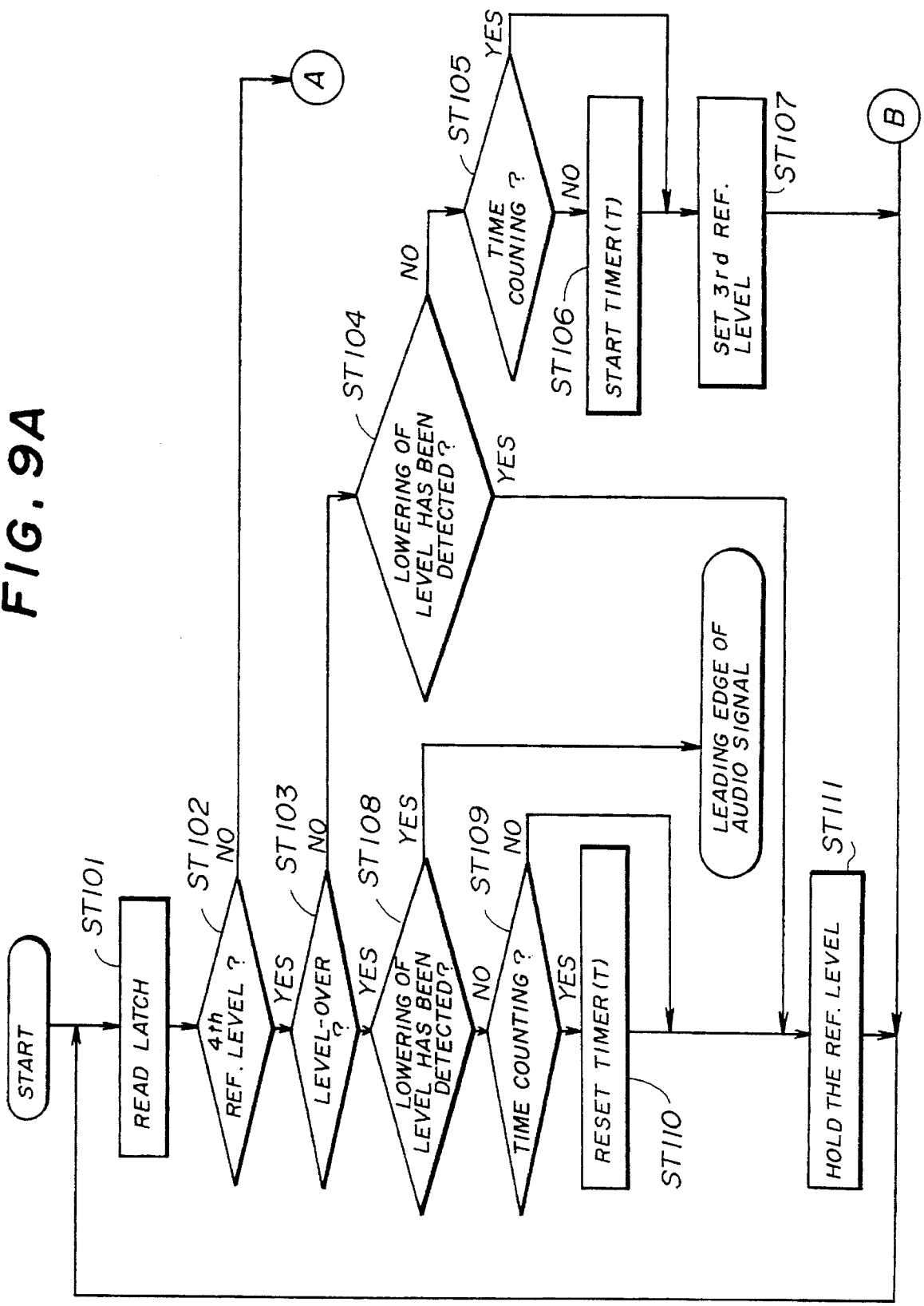
FIG. 9A, 9B, 9C and 9D are flow charts illustrating, a process for detecting the leading edge of an audio signal to be recorded in the DAT.

Referring to FIG. 9A, the microcomputer 18 reads out the determination result latched in the latch circuit 26 (ST101), and determines whether or not a level setting signal supplied to the level determination circuit 17 is the fourth level setting signal (ST102). Since the fourth level setting signal is output from the microcomputer 18, the microcomputer 18 determines, based on the determination result obtained in step 101, whether or not the audio signal is in the level over condition. While the audio signal is active, the level-over condition in which the level of the audio signal is higher than the fourth reference level (e.g. −55 dB) is maintained. Then, after this, steps ST101, 102, 103, 108, 109 and 111 are repeated.

When the audio signal becomes inactive such that the level thereof reaches a value, for example, between the first reference level (e.g. −70 dB) and the second reference level (e.g. −65 dB), the process is performed as follows The microcomputer 18 determines, in step ST103, that the audio signal is not in the level-over condition, and it is then determined, in step ST104, whether or not the lowering of the level of the audio signal (the inactivity of the audio signal) has already been detected. If the lowering of the level of the audio signal has not yet been detected, steps 105, 106 and 107 are executed so that a timer T is started and the third level setting signal is supplied from the microcomputer 18 to the level determination circuit 17. As a result, in the level determination circuit 17, the determination process using the third reference level (e.g. −60 dB) is started. After the microcomputer 18 reads out the determination result from the level determination circuit 17 in step ST101, the process proceeds via step ST102 to step ST121 shown in FIG. 9B.

Figure 9B:
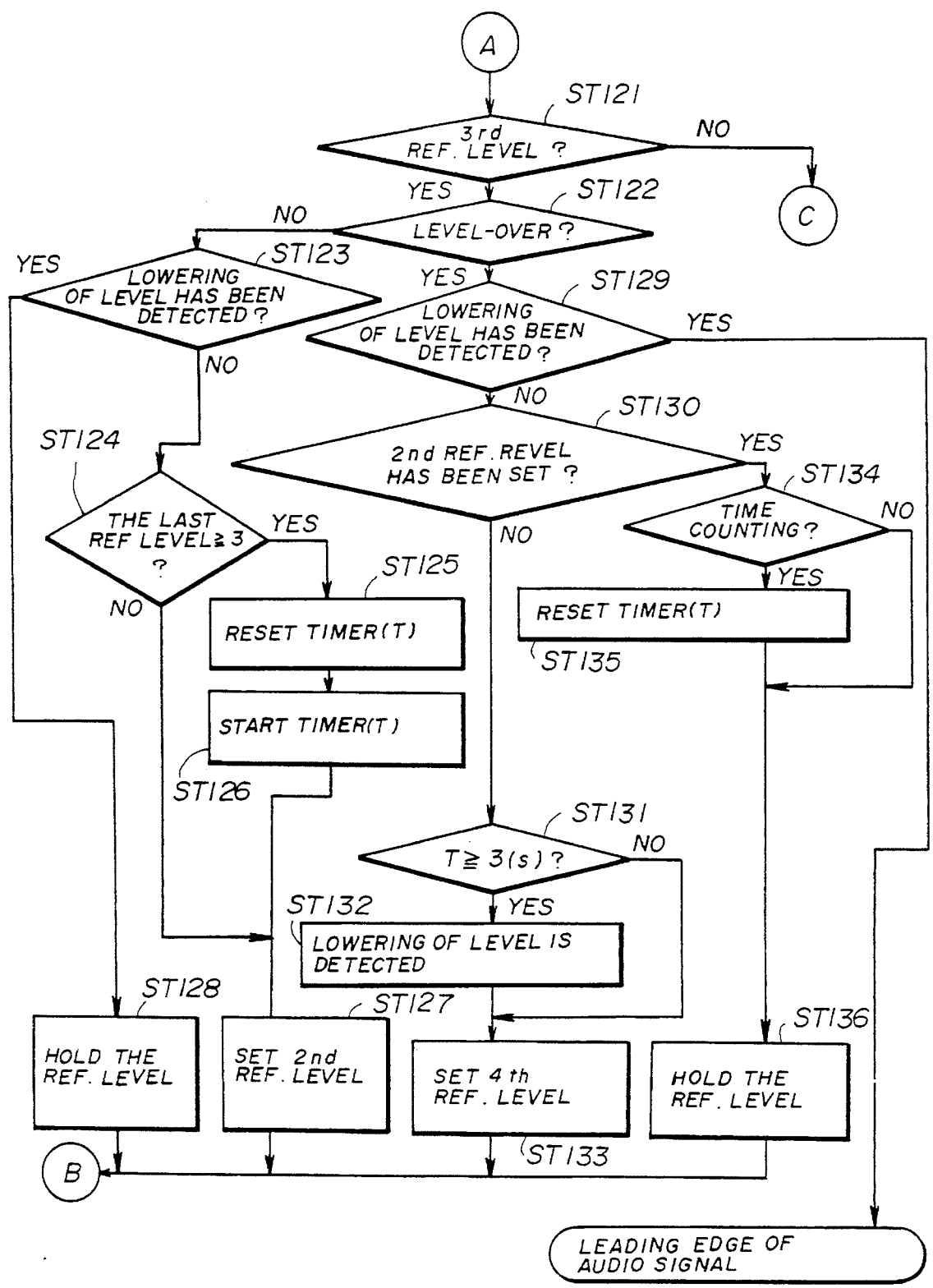

Referring to FIG. 9B, after the microcomputer 18 determines, in step ST121, that the third reference level has been set in the level determination circuit 17, it is determined, in step ST122, whether or not the audio signal is in the level-over condition. In this case, as the level of the audio signal has reached the value between the first and second reference levels, the process proceeds from step ST122 to step ST123. In step ST123, it is determined whether or not the lowering of the level of the audio signal has been already detected. If the lowering of the level of the audio signal has not yet been detected, it is then determined, in step ST 124, whether or not the last reference level is equal to or greater than the third reference level. In this case, as the last reference level is the fourth reference level which is greater than the third reference level, the timer T is reset and restarted in steps ST125 and ST126. After this, the microcomputer 18 supplies the second level setting signal to the level determination circuit 17 in step ST127. As a result, in the level determination circuit 17, the determination process using the second level (e.g. −65 dB) is started. After the microcomputer 18 reads out the determination result from the level determination circuit 17 in step ST101, the process proceeds via steps ST102 and ST121 to step ST151 shown in FIG. 9C.

Figure 9C:
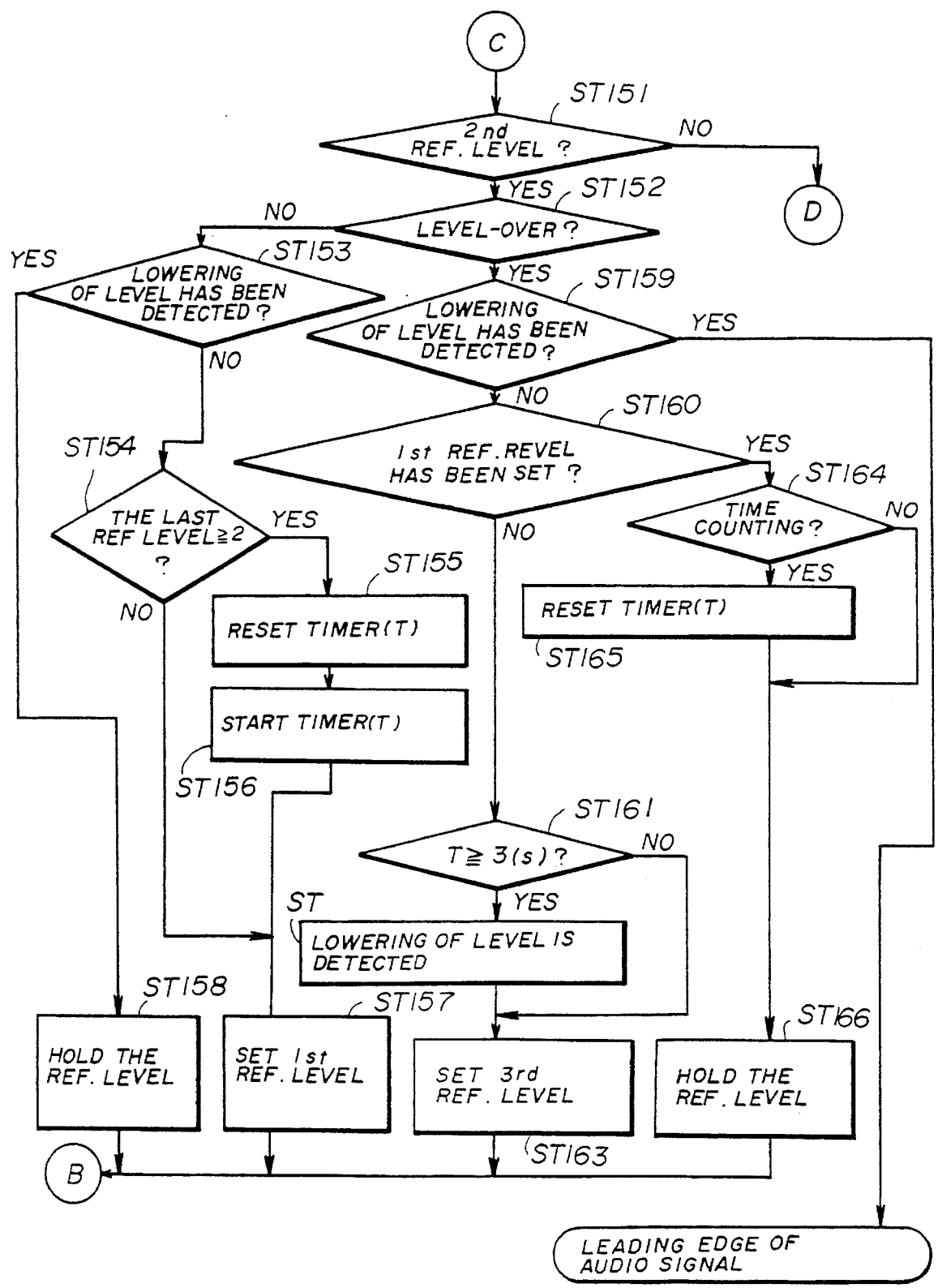

Referring to FIG. 9C, after the microcomputer 18 determines, in step ST151, that the second reference level has been set in the level determination circuit 17, steps ST152 through ST157 are executed in the same manner as steps ST122 through ST127 shown in FIG. 9B. As a result, the microcomputer 18 supplies the first level setting signal to the level determination circuit 17. The level determination circuit performs the determination process using the first reference level (e.g. −70 dB). After the microcomputer 18 reads out the determination result from the determination circuit 17 in step ST101, the process proceeds via steps ST102, ST122 and ST151 to step ST170 shown in FIG. 9D.

Figure 9D:
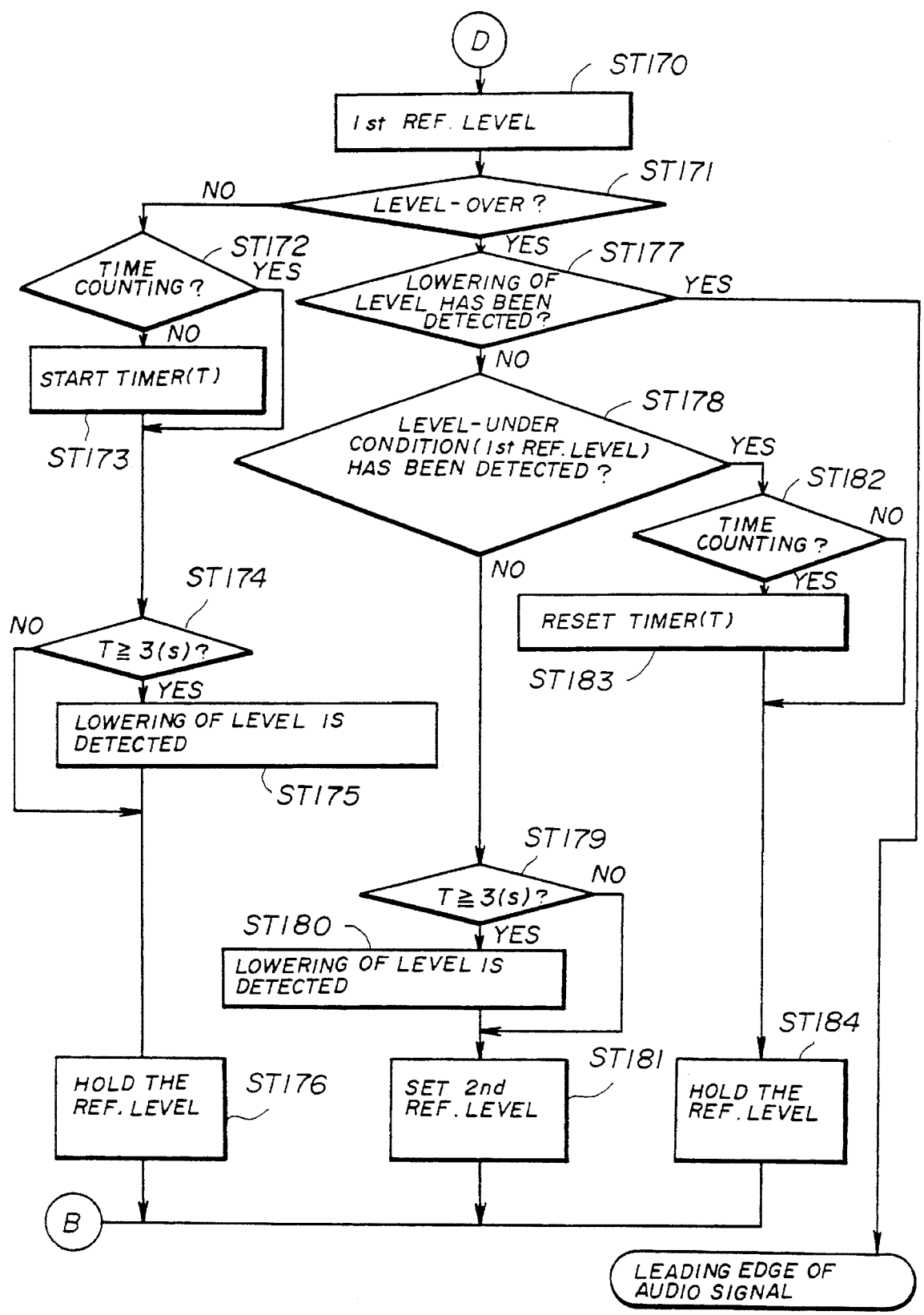

Referring to FIG. 9D, after the microcomputer 18 determines, in step ST170, that the first reference level has been set in the level determination circuit 17, it is determined, in step 171, whether or not the audio signal is in the level-over condition. In this case, as the level of the audio signal has reached the value between the first and second reference levels, the process proceeds from step ST171 to step ST177. In step 177, it is determined whether or not the lowering of the level the audio signal has already been detected. At this time, if the lowering of the level of the audio signal has not yet been detected, it is further determined, in step ST178, whether or not the level-under condition of the audio signal has already been detected using the first reference level. Since the level-under condition of the audio signal has not yet been detected using the first reference level, it is then determined, in step ST179, whether or not the timer restarted in step ST156 shown in FIG. 9C has reached 3 seconds. If the timer T has not reached 3 seconds, the first reference level is switched to the second reference level in step ST181. After this, the process returns from step ST181 to step ST151 shown in FIG. 9C via steps ST101, ST102 and ST121. Steps ST151, ST152, ST153, ST154 and ST157 are then successively executed. As a result, the second reference level is switched back to the first reference level. After this, steps ST170, ST171, ST177, ST178, ST179 and ST181 shown in FIG. 9D and steps ST151, ST152, ST153, ST154 and ST157 shown in FIG. 9C are alternately performed until the timer T reaches 3 seconds. That is, in the level determination circuit 17, while repeatedly switching the first reference level to the second reference level and vice versa, the determination process is performed. When it is determined, in step S179 shown in FIG. 9D, that the timer T has reached 3 seconds, the microcomputer 18 detects the lowering of the level of the audio signal in step ST180. The first reference level is then switched to the second reference level in step ST181. After this, the process returns to step ST 151 shown in FIG. 9C.

Referring to FIG. 9C, after the microcomputer 18 determines, in step ST151, that the second reference level has been set in the level determination circuit 17, it is determined, in step ST152, whether or not the audio signal is in the level-over condition. Since, at this time, the level of the audio signal is between the first and second reference levels, the process proceeds from step ST152 to ST153. If it is determined, in step ST153, that the lowering of the level of the audio signal has already been detected, the second reference level is maintained as it is, in step ST158. After this, steps ST151, ST152, ST153 and ST158 are repeatedly performed until the audio signal rises (for example, music starts). When the audio signal rises and the level of the audio signal exceeds the second reference level, it is determined, in step ST152, that the audio signal is in the level-over condition. As, at this time, the lowering of the level of the audio signal has already been detected, the leading edge of the audio signal is detected based on the determination result obtained in step ST159.

As has been described above, in a case where the audio signal has been lowered to a level between the first reference level (e.g. −70 dB) and the second reference level (e.g. −65 dB) at the end of music, the leading edge of the audio signal (corresponding to the next music) is detected using the second reference level. In a case where the audio signal has been lowered to a level between the second reference level (e.g. −65 dB) and the third reference level (e.g. −60 dB) at the end of music, steps ST151, ST152, ST159, ST160, ST161, and ST163 shown in FIG. 9C and steps ST121, ST122, ST123, ST124 and ST127 shown in FIG. 9B are alternately performed until the timer T reaches 3 seconds. That is, in the level determination circuit 17, while repeatedly switching the second reference to the third reference level and vice versa, the determination process is performed. In this case, when the level of the audio signal exceeds the third reference level, the leading edge of the audio signal corresponding to the next music is detected. Furthermore, in a case where the audio signal has been lowered to a level between the third reference level (e.g. −60 dB) and the fourth reference level (e.g. −55 dB) at the end of music, steps ST121, ST122, ST129, ST130, ST131 and ST133 shown in FIG. 9B and steps ST101, S102, ST103, ST104, ST105 and ST107 shown in FIG. 9A are alternately performed until the timer T reaches 3 seconds. That is, in the level determination circuit 17, while repeatedly switching the third reference level to the fourth reference level and vice versa, the determination process is performed. In this case, when the level of the audio signal exceeds the fourth reference level, the leading edge of the audio signal corresponding to the next music is detected.

If the audio signal has been lowered to a level less than the first reference level (e.g. −70 dB), after the timer T is restarted in step ST156 shown in FIG. 9C, steps ST170, ST171, ST172, ST174 and ST176 are repeatedly performed so as to monitor whether or not the timer T reaches 3 seconds. When the timer T has reached 3 seconds, the lowering of the level of the audio signal is detected in step ST175. In this case, when the level of the audio signal exceeds the first reference level (e.g. −70 dB), the leading edge of the audio signal corresponding to the next music is detected (steps ST171 and ST177).

When the audio signal varies within a low level range between the first reference level and the fourth reference level, the timer T is repeatedly reset (steps ST130, ST134, ST135 and ST136 shown in FIG. 9B, steps ST160, ST164, ST165 and ST166 shown in FIG. 9C, and steps ST188, ST182, ST183 and ST184 shown in FIG. 9D). Thus, under this condition, the lowering of the level of the audio signal is not detected.

The present invention is not limited to the aforementioned embodiments, and variations and modifications may be made without departing from the scope of the claimed invention.

What is claimed is:

1. A unit for detecting a leading edge of a signal, said unit comprising:

comparing means for comparing a level of a signal supplied from an external-unit with a reference level;

detecting means for detecting a position of the leading edge of the signal based on comparison results obtained by said comparing means; and reference level changing means for changing the reference level used by said comparing means among predetermine different levels which have been prepared as reference levels in accordance with the signal supplied from said external unit.

2. The unit as claimed in claim 1, wherein said reference level changing means comprises reference level setting means for setting a reference level selected from among a plurality of reference levels, level determination means for determining whether or not the level of the signal is lower than the reference level set by said reference level setting means, and changing control means for controlling said reference level setting means so that a reference level to be set decreases when said level determination means determines that the level of the signal is lower than the reference level set by said reference level setting means.

3. The unit as claimed in claim 2, wherein said level determination means has means for detecting that the level of the signal is lower than the reference level, time counting means for counting a time for which said means of said level determination means is detecting that the level of the signal is lower than the reference level, and determination means for determining whether or not the time obtained by said time counting means is greater than a predetermined value, and wherein it is determined that the level of the signal is lower than the reference level when said determination means determines that the time is greater than the predetermined value.

4. A unit for detecting a leading edge of a signal, said unit comprising:

comparing means for comparing a level of a signal supplied from an external unit with a reference level;

detecting means for detecting a position of the leading edge of the signal based on comparison results obtained by said comparing means; and reference level changing means for changing the reference level used by said comparing means from one level to another within a predetermined number of levels in accordance with comparison results.

5. The unit as claimed in claim 4, wherein said reference level changing means comprises reference level setting means for setting a reference level selected from among a plurality of reference levels, level determination means for determining whether or not the level of the signal is lower than the reference level set by said reference level setting means, and changing control means for controlling said reference level setting means so that a reference level to be set decreases when said level determination means determines that the level set by said reference level setting means.

6. The unit as claimed on claim 5, wherein said level determination means has means for detecting that the level of the signal is lower than the reference level, time counting means for counting a time for which said means of said level determination means is detecting that the level of the signal is lower than the reference level, and determination means for determining whether or not the time obtained by said time counting means is greater than a predetermined value, and wherein it is determined that the level of the signal is lower than the reference level when said determination means determines that the time is greater than the predetermined value.

* * * * *